June 13, 1961  R. FOELSTER ET AL  2,988,385
COMBINATION PIPE UNION ELBOW
Filed May 13, 1958
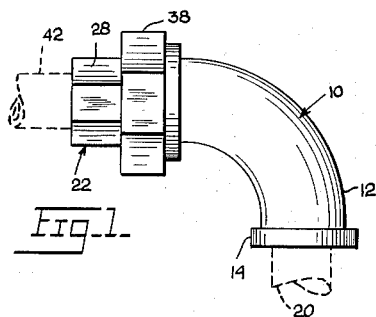
Fig. 1.
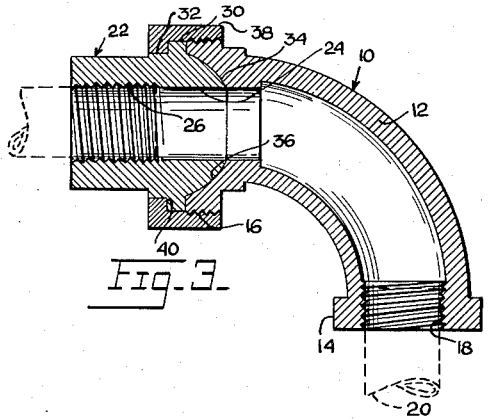
Fig. 3.
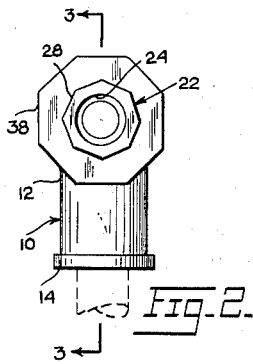
Fig. 2.
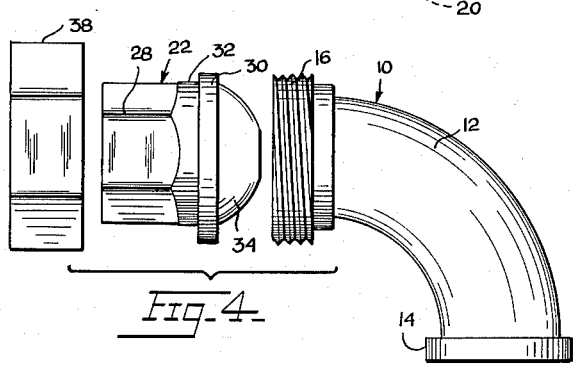
Fig. 4.
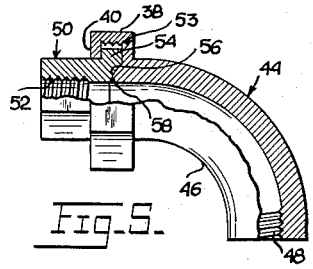
Fig. 5.
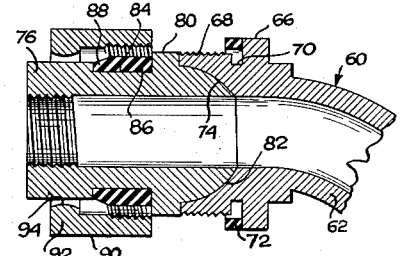
Fig. 6.
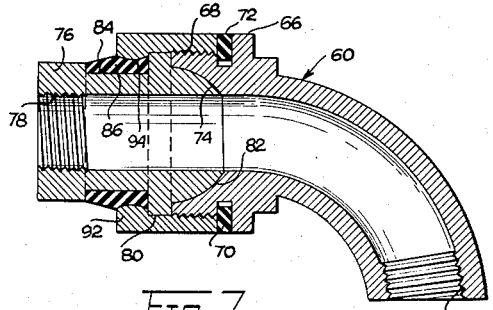
Fig. 7.
Fig. 8.
INVENTORS
RICHARD FOELSTER
ELMER BILLINGTON
BY
ATTORNEY United States Patent Office 2,988,385
Patented June 13, 1961

1

2,988,385
COMBINATION PIPE UNION ELBOW
Richard Foelster, 24—36 27th St., Astoria, N.Y., and Elmer Billington, Cedar Lane, Tex.
Filed May 13, 1958, Ser. No. 735,048
1 Claim. (Cl. 285—179)

This invention relates to pipe fittings, and more particularly has reference to a combination pipe union and elbow.

Most usually, an elbow is formed as a fitting separate and distinct from a conventional union, and as a result, there is substantial expense involved, in that these items must be separately purchased and must be separately applied.

The main object of the present invention is to provide a combined union and elbow that will have the characteristics of both of these ordinarily separate fittings.

A further object is to provide a union and elbow that will be designed to permit swift connection of the same to pipes at opposite sides of the fitting.

Another object is to provide a combined union and elbow that will be proportioned for permitting free swiveling movement of a coupling member at one end of the device, during the connection or disconnection of an adjacent pipe.

Another object is to permit said swiveling movement through a full 360°.

Another object is to provide means in the device which will lock the ordinarily rotatable coupling member against swiveling movement after the connection of the pipe to the device has been effected.

Still another object is to provide a device of the character stated that will be adapted, in one form of the invention, to permit relative adjustments of the components of the device to an intermediate position which will allow swiveling movement of the coupling member while still providing a leaktight connection between the several components, whereby the coupling member can be adjusted in position, or swiveled, without interrupting flow through the device.

Still another object of importance is to provide a union elbow which will be so designed that the coupling member and spanner nut thereof can be standard components in all forms of the device, with the elbow-shaped body being still designed for manufacture with any of various angles, that is, the device can be a 90° elbow, a 45° elbow, etc., with the same coupling member and spanner nut being used in every form of the invention.

Still another object is to permit the same coupling member and spanner nut to be associated with elbow-shaped bodies that are of the reducer or adapter type, so that pipes of different diameters can be connected to opposite ends of the device.

Still another object is to provide a union elbow of the character stated that will be relatively inexpensive, being adapted for manufacture at little increase in cost above the cost involved in the manufacture of an elbow alone or a union alone.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a side elevational view of a union elbow according to the present invention, a pair of pipes connected thereby being shown fragmentarily and in dotted lines.

FIG. 2 is an end elevational view of the device as seen from the left of FIG. 1.

FIG. 3 is an enlarged longitudinal sectional view therethrough substantially on line 3—3 of FIG. 2.

FIG. 4 is an enlarged side elevational exploded view of the device.

FIG. 5 is a view partially in side elevation and partially in longitudinal section of a modified form.

FIG. 6 is an enlarged, fragmentary, longitudinal sectional view of another modification, showing the parts as they appear before being completely connected.

FIG. 7 is a longitudinal sectional view of the modification showing in FIG. 6, with the portions of the joint or elbow fully connected.

FIG. 8 is a view like FIG. 6 of the modification shown in FIG. 6, showing the components in an intermediate position between the fully disconnected and fully connected positions shown in Figs. 6 and 7 respectively.

Referring to the drawings in detail, in the form of the invention shown in FIGS. 1-4, the union elbow has been generally designated at 10, and comprises an arcuate, tubular body 12, curved through 90° in the illustrated embodiment, although of course the elbow could be other than a 90° elbow if desired. At one end, body 12 has an external flange or collar 14, while at the other end, the device has an external, threaded collar 16 (see FIG. 4).

Internal threads 18 are formed in the end of body 12 having collar 14, receiving a complementarily threaded end of a first pipe 20, that is to be joined to a second pipe 42 by means of an elbow.

Generally designated 22 is a connector member, in the form of a short tube or nipple, having an axial bore 24 which is smooth-walled at the inner end of said member, and which is threaded as at 26 at the other end thereof.

Externally, the member 22, at the end thereof having the internal threads 26, is of noncircular or polygonal cross section as shown at 28, so as to permit a wrench or similar tool to be applied thereto for the purpose of effecting rotatable movement of the member 22. In the assembled relationship of the parts, the noncircular outer end portion projects in position to be engaged by a wrench as clearly shown in Fig. 1.

Intermediate its ends, member 22 has an external, circumferential collar 30, and between collar 30 and the portion 28 there is a relatively narrow, smooth-surfaced, annular shoulder 32, the purpose of which will be presently made apparent.

Between collar 30 and the inner extremity of the member 22, said member is externally, progressively reduced in diameter toward its inner end, tapering along a curving line as indicated at 34. Body 12, at the end thereof adjacent the member 22, is internally provided with a flaring seat 36 complementary to the rounded or tapering end 34, so that the member 22 can swivel in the seat 36 in certain circumstances to be described in detail hereinafter.

Designated at 38 is a spanner nut externally formed to receive a wrench and having at one end an inwardly directed, circumferential shoulder 40 adapted to bear against the collar 30 while rotatably bearing upon the shoulder 32 of the coupling member 22. The spanner nut is applied to the member 22, being slipped onto the outer end portion 28 thereof. Thereafter, the spanner nut is moved axially of the member 22 until it comes to engage the shoulder 40 with the threads of the nut engaging threads 16. Rotation of the spanner nut in a direction to thread the same onto the threaded collar 16 now will cause the coupling member 22 to be brought sealably, fixedly into engagement with the seat 36. When the spanner nut is backed off into a slight extent, the member 22 is free to rotate or swivel within the seat 36, thus to facilitate its being connected to or disconnected from pipe 42.

The arrangement eliminates many straight union connections where an elbow is in line, this being common in most plumbing arrangements. This prevents, in many instances, leaks which would otherwise tend to occur, while at the same time reducing labor costs as well as material costs. Ordinarily, elbows are separate from unions, and the present device, which replaces both an elbow and a union, can be made at a cost far below that which would be required for an elbow and a union.

Further, the device may swing through 360°, which imparts considerably more versatility to the same. It can also be made into a straight elbow from either end, and can be at any angle from one degree to 360°. Still further, the device can be made into a reducing elbow if desired.

In the form of the invention shown in FIG. 5, the device has been generally designated 44 and includes an elbow-shaped body 46 having at one end internal threads 48 to receive pipe 20. The other end abuts a coupling member 50 in the form of a short tube having internal threads 52 at its outer end, and having its outer end portion externally formed to receive a wrench or the like. The inner end of the coupling member 50 has an internal collar 54 adapted to be engaged by the inwardly directed lip or flange 40 of the spanner nut 38 when the spanner nut is threaded onto the adjacent, externally threaded collar 53 of body 46.

In this form, the body 46 has a tapered male projection 56 engaging in a flared seat 58 of the coupling member. However, the operational characteristics of the device are the same as in the first form of the invention.

In FIGS. 6–8, another form generally designated 60 is shown, including a tubular body 62 having at one end internal threads 64 and having at its other end external threads 68. The threaded end 68 is closely spaced from an external, circumferential abutment or collar 66 by a relatively narrow circumferential groove 70 adapted to receive a compressible annular gasket 72. The body has a flared seat 74 at the end of the body that abuts the coupling member 76. Coupling member 76 has internal threads 78 at its outer end for receiving pipe 42, said outer end being externally shaped to receive a wrench.

Adjacent the tapered end 82 of coupling member 76 is a circumferential annular flange or collar 80, and between collar 80 and the noncircular end portion of the coupling member, there is a shallow, wide groove 84 extending continuously through the full circumference of the coupling member to receive a correspondingly wide, radially compressible gasket 86.

The gasket 86 in its uncompressed condition projects slightly out of groove 84. The gasket, at the side thereof adjacent the outer extremity of the coupling member, has a gradual slope 88 to the outer surface of the coupling member so that the outer surface of the gasket in effect merges into the surface of the coupling member.

Designated at 90 is a spanner nut having an inwardly directed lip 92 the inside periphery of which is rounded as at 94.

In use, the parts initially appear as in FIG. 6. The spanner nut is now moved to the right in FIG. 6, being freely movable past the abutment 80 at the threaded side the the spanner nut. The threads of the spanner nut now engage the threaded end 68 of body 62. Previously, gasket 72 was positioned against collar 66.

As the spanner nut is threaded onto the end portion 68, the rounded surface 94 thereof will come to bear against the sloped surface 88 of gasket 86. The gasket is thus compressed, and ultimately, lip 92 rides onto the high side of the gasket, compressing the same when the lip moves into engagement with collar 80. When the lip is in this position, shown in FIG. 7, gasket 86 is compressed at its point of maximum thickness, to provide a seal at this location. Meanwhile, the spanner nut has also compressed the gasket 72, forcing the same into the groove 70 to provide a seal between the spanner nut and the body while also providing a seal between the spanner nut and the coupling member.

This is the usual position of the parts, shown in FIG. 7.

It may be desired to detach a pipe from the coupling member. In this event, the spanner nut is backed off only slightly as in FIG. 8. When this happens, the coupling member can be rotated, but a seal still exists between the spanner nut and the gasket 86, and also exists between the spanner nut and the gasket 72. This arrangement permits swiveling of the coupling member as necessary, in the event said swiveling is desirable while flow is still passing through the union elbow. In fact, the arrangement shown in FIG. 8 can be one employed initially when a joint is made, and in the event that leaks develop, the spanner nut can be turned a few more times, to move from its FIG. 8 to its FIG. 7 position to place the gasket 72 under increased compression.

The arrangement shown in FIGS. 6–8 may also be employed where it is desired to maintain flow between adjacent tubular members, one of which may be regularly or even infrequently swiveled relative to the other.

In all forms of the invention there are the common characteristics wherein a union and an elbow are effectively combined, in a relatively inexpensive device that serves the purposes which have heretofore been discharged by both of these members separately.

While we have illustrated and described the preferred embodiments of our invention, it is to be understood that we do not limit ourselves to the precise constructions herein disclosed and that various changes and modifications may be made within the scope of the invention as defined in the appended claim.

Having thus described our invention, what we claim as new, and desire to secure by United States Letters Patent is:

A union structure, comprising a tubular elbow threaded at one end for connection to a pipe and having a radially outwardly extending annular collar near the other end, said other end being externally threaded and having a concave internal seat, a coupling member having a convex end fitted in said seat, said coupling member having an annular flange extending radially beyond said convex end, a spanner nut threadedly engaged on said other end of the elbow, a first ring gasket interposed between said collar and one end of the spanner nut and compressed in directions axially of the nut and radially of the end of the elbow on fully threading of the nut upon said other end of the elbow, said first ring gasket being of such a thickness to allow it to expand axially as said spanner nut is threaded away from said coupling thereby maintaining a seal between said collar and one end of the spanner nut, and a generally cylindrical second gasket circumferentially engaged on a cylindrical surface on the coupling member in abutment with said flange, said spanner nut having an inner peripheral lip rounded in cross section and having an inner diameter smaller than the diameter of the second gasket in an uncompressed state and smaller than the diameter of said flange and having an internal radially outwardly extending shoulder formed by the lip which bears against said annular flange when fully threaded on said elbow thereby binding said coupling member immovably against said elbow; the radial spacing of said coupler cylindrical surface and said rounded lip being less than the radial thickness of said second gasket whereby said nut when fully threaded on said other end of the elbow compresses the second gasket against said lip, said coupler cylindrical surface and said flange, said nut when threaded away from said coupling member remaining engaged with and radially compressing the second gasket against said coupler cylindrical surface so that the nut does not slip off the coupling member when said member is disengaged from the elbow.

References Cited in the file of this patent

UNITED STATES PATENTS

| | | | |
|---|---|---|---|
| Re. 23,091 | Ford | Mar. 15, | 1949 |
| 235,580 | Dunn | Dec. 14, | 1880 |
| 572,911 | Schmidt | Dec. 8, | 1896 |
| 615,005 | McGahan | Dec. 13, | 1898 |
| 839,090 | Ayer | Dec. 25, | 1906 |
| 1,894,700 | Parker | Jan. 17, | 1933 |
| 2,477,677 | Woodling | Aug. 2, | 1949 |
| 2,520,896 | Smulski | Aug. 29, | 1950 |
| 2,677,416 | Smith | May 4, | 1954 |
| 2,867,463 | Snider | Jan. 6, | 1959 |

FOREIGN PATENTS

| | | | |
|---|---|---|---|
| 593,953 | Germany | Mar. 7, | 1934 |